United States Patent [19]
Pellegrino et al.

[11] Patent Number: 5,933,483
[45] Date of Patent: Aug. 3, 1999

[54] SYSTEMS AND METHODS FOR PROVIDING PERSONAL, NON-GEOGRAPHIC CALL MANAGEMENT

[75] Inventors: Michael A. Pellegrino, North Plainfield; Barry Shawn Seip, New Providence, both of N.J.

[73] Assignee: AT & T Corp., Middletown, N.J.; 07748

[21] Appl. No.: 08/749,118

[22] Filed: Nov. 14, 1996

[51] Int. Cl.[6] .............................. H04M 3/42; H04M 17/00
[52] U.S. Cl. .......................... 379/201; 379/207; 379/144; 379/211
[58] Field of Search ..................................... 379/201, 207, 379/210, 211, 212, 217, 220, 221, 219, 112, 114, 142, 143, 144, 88.01, 88.15

[56] References Cited

U.S. PATENT DOCUMENTS

| | | | |
|---|---|---|---|
| 4,313,035 | 1/1982 | Jordan et al. | 379/207 |
| 5,315,636 | 5/1994 | Patel | 379/211 |
| 5,329,578 | 7/1994 | Brennan et al. | 379/196 |
| 5,610,972 | 3/1997 | Emery et al. | 379/207 |
| 5,666,405 | 9/1997 | Weber | 379/142 |

*Primary Examiner*—Krista Zele
*Assistant Examiner*—Benny Q. Tieu

[57] ABSTRACT

Systems and methods for providing personal, bi-directional, non-geographic base call management are presented. An inter-exchange provider network enables subscribers to obtain a personal telephone number that is independent of the subscriber's residence. As such, the subscriber retains the personal phone number even when the subscriber move to another part of the country. The personal telephone number may be used to receive inbound calls, either through call forwarding features, paging or voice mail, and to place outbound calls using the personal number as a calling card number. In this manner, a subscriber's telephone needs may be consolidated with a single carrier that provides simplified access for the subscriber while following the subscriber where ever the subscriber moves. The subscriber is also provided with access to customize the call management features provided by the inter-exchange carrier through a phone call.

23 Claims, 5 Drawing Sheets

SYSTEMS AND METHODS FOR PROVIDING PERSONAL, NON-GEOGRAPHIC CALL MANAGEMENT

BACKGROUND OF THE INVENTION

This invention relates to the transmission of communications over a communications network. More particularly, this invention relates to systems and methods for providing bi-directional call management capabilities to users having non-geographic telephone numbers.

Telephone numbers are traditionally correlated to a specific physical location, such as an individual's house. In such cases, call management for an individual telephone number is performed on an address-by-address basis. The call management for each address is typically performed by the local exchange carrier (i.e., the "LEC") that the residence is connected to. Therefore, if several individuals reside in a single residence, one or more individuals at that residence must be accountable to the LEC for the phone line, rather than the LEC having the capability to manage calls for each individual. All outgoing calls placed through telephones (including modems, facsimiles machines, etc.) located within the residence are billed to the residential, geographic-based, telephone number, as well as any phone calls placed using a calling card that is often linked to the geographic-based telephone number. In this manner, the residence receives a single phone bill that summarizes telephone activity for the given address.

One problem with traditional, geographically-based, telephone call management is that telephone numbers must be changed every time individuals change residence. As a result, individuals may obtain various telephone services from different carriers to reduce the number of changes that are typically required when the individual changes residences (e.g., a user might have their 1+ long distance company be AT&T while also obtaining a calling card from another carrier). However, this still results in the individual receiving multiple bills and having to carry multiple calling cards, each having its own unique personal identification number (i.e., PIN code—a security code formed from additional information that is typically not shown on the card, but is often required to access the services provided by the card). When an individual utilizes a calling card from another carrier (i.e., not the 1+ long distance company), the calling card number is typically merely a billing account number that enables the carrier to bill the individual for calls made using the calling card, rather than a number that is related to the individual's geographically-based telephone number. Thus, the individual must remember and protect an additional number, often greater than 10 digits, to place calls (theft of a calling card number is unfortunately made easier when then number must be referred to by the individual while dialing—a problem that may be alleviated by reducing the quantity of numbers that an individual must use to place calls).

One service that has been implemented to address these problems is the personal telephone number service. A personal telephone number, unlike a geographic-based number, is not geographically based, but is instead, related to an individual or business, rather than to a residence. Known examples of these non-geographic-based numbers are telephone numbers that begin with 800 or 888, instead of an area code (where an individual calling an 800, for example, knows who the call is routed to, but does not know where, geographically, the call is answered). Jordan et al. U.S. Pat. No. 4,313,035 describes a method of providing person locator service in which a called subscriber may be reached by dialing a personal number unique to the subscriber. The subscriber is assigned a personal telephone number and given access to set the features related to that number. For example, if the subscriber is home, the subscriber could dial into the personal telephone number system and set the forwarding feature to be the home phone number (the forwarding feature may be used to direct the call to any stationary phone number). If, however, the individual is going to be "mobile," the personal number would be set to paging mode so that any incoming calls are forwarded to a paging device (or the incoming calls could instead be directed to voice-mail). Under these circumstances, the subscriber's personal phone number would not have to change when the subscriber moved because the number is not tied to a specific residence. This solution, however, does not address the problems of placing outgoing calls, which would still be tied to the geographic-based phone number.

It would therefore be desirable to provide systems and methods that provide bi-directional call management services to individuals that are not tied to specific residences.

It would also be desirable to provide systems and methods that provide a full-range bi-directional call management services to individuals so that individuals need only utilize a single service provider for their telephone needs.

SUMMARY OF THE INVENTION

The above and other objects of the invention are met by the present invention in which non-geographic telephone numbers are allocatable to individuals that may be used to make and receive phone calls, as well as manage the individuals' use of the telephone. Each individual subscriber is assigned a personal telephone number that is unique to the entire telephone system (versus geographic-based phone numbers that are assigned by LECs and are intended to be unique to a given region, such as within a geographic-based area code). The uniqueness of the personal number provides nationwide access to the number regardless of the residence of the individual. By simply dialing the personal number, calls may be placed to the individual where ever he/she is located. Additionally, and in accordance with the principles of the present invention, the personal phone number is configured such that outbound calling may also placed using the personal number as a calling card number.

Further advantages of the present invention may be achieved by: (1) coupling the personal number with a central call management interface through which the individual may customize his/her personal telephone service; (2) coupling the personal number a to voice-mail system that receives messages when calls to the personal number go unanswered; (3) linking the personal phone number with a 1-800 number so that the personal number may be called even if a local phone company does not provide access to the personal phone number service; and (4) reverse billing to enable the individual to pay for incoming calls in addition to outgoing calls.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE DRAWINGS

Figure 1:
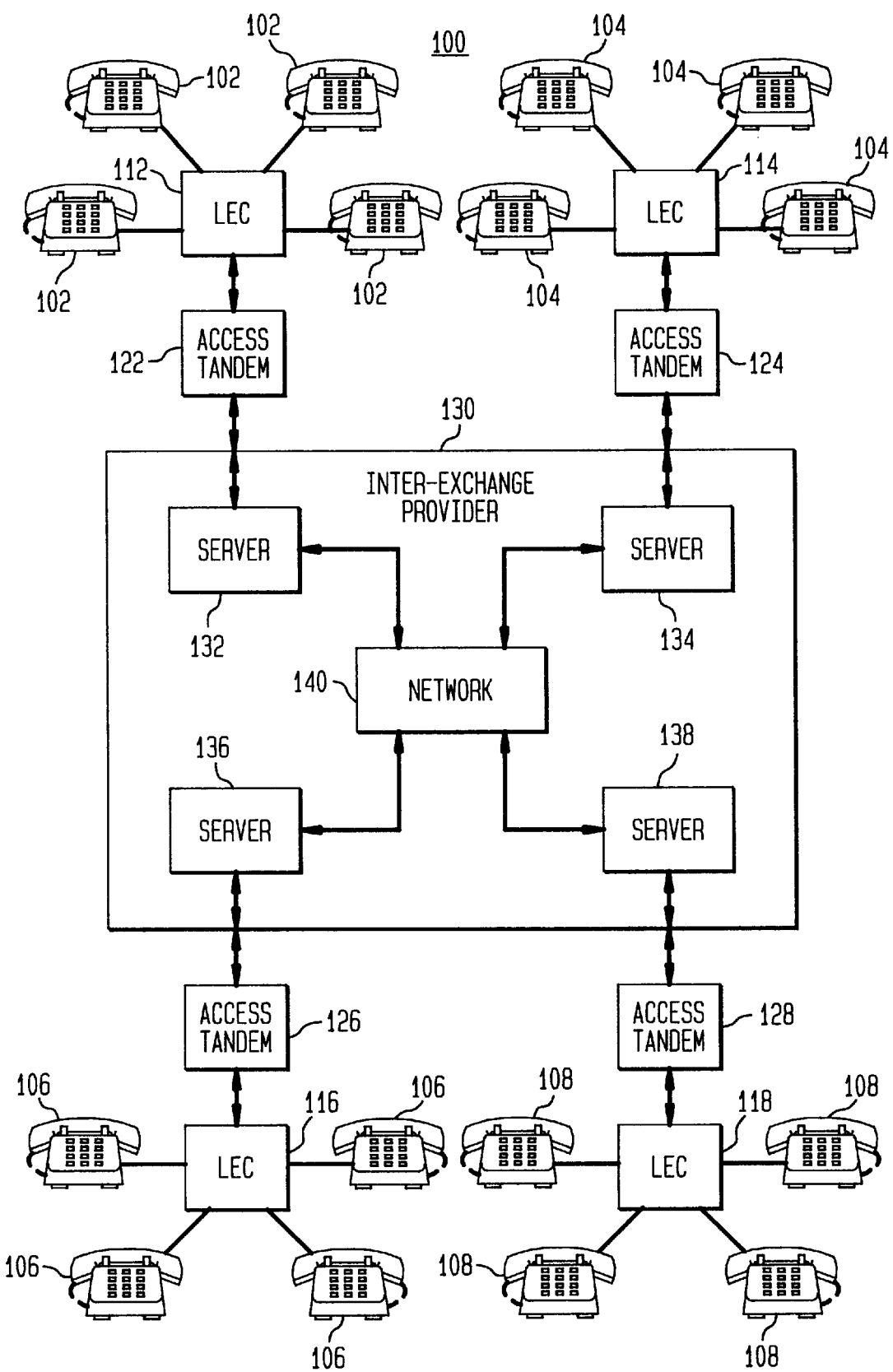
FIG. 1 is a schematic diagram of a communication network that illustrates the principles of the present invention.

The present invention provides improved call management capabilities to individuals by providing non-geographic telephone numbers that may be used for both inbound and outbound telephone calls, as well as a central location for call management. A communications system 100 is shown in FIG. 1 to illustrate the principles of the present invention. The basic components of the system 100 include multiple local exchange carriers ("LECs") 112, 114, 116 and 118, where each LEC is located in a region designated by the last digit of the reference numeral in FIG. 1 (e.g., LEC 112 is in the "XX2" region), an access tandem (122, 124, 126 and 128, respectively) connected to each LEC to provide the LECs with access to the inter-exchange provider networks, and an inter-exchange provider ("IXP") network 130.

Each of the LECs connects many individual telephones (i.e., telephones 102, 104, 106 and 108, respectively) together through one or more end offices (not shown). The end offices, which are connected together within each LEC, merely break the LEC into smaller, more manageable components. Each of telephones 102, 104, 106 and 108 represents a physical telephone that has a corresponding telephone number tied a specific address. Telephone calls within the LEC are simply routed from the caller, through the LEC to the receiver, while inter-LEC calls must be placed through an inter-exchange provider, such as IXP 130. When an individual moves from the region covered by one LEC to the region of another LEC (or even from one end office to another end office within a LEC), that individual's telephone number must change.

Inter-exchange provider 130 preferably includes a local server in at least the region of each LEC, as shown by server 132 in region XX2, and servers 134, 136 and 138 (in regions XX4, XX6 and XX8, respectively). The servers the IXP 130 are connected together by a network 140. Network 140 represents both a traditional long-distance network and a data network, such as the Internet, for exchanging information between servers. Each of the local servers is connected to the corresponding LEC through the appropriate one of access tandems 122, 124, 126 and 128.

In accordance with the principles of the present invention, personal, non-geographic based, telephone numbers are established by inter-exchange provider 130 for individuals subscribing to a personal phone number service. The personal phone numbers are assigned a prefix that identifies the phone numbers as being personal numbers to the LECs. An individual (not shown) desiring to call a personal phone number may place the call from any of telephones 102, 104, 106 and 108. The call is directed by the appropriate LEC through the appropriate access tandem to a server within IXP 130. Depending on the configuration selected by the subscriber, the call is directed to one of telephones 102, 104, 106 and 108, to a paging device, or to a voice mail system within IXP 130. Further, when the subscriber wishes to place an outgoing call at his/her expense, the subscriber merely dials zero plus the phone number being called on one of phones 102, 104, 106 and 108, and then enters the personal phone number as a calling card number. If desired, a PIN may be required for additional security.

Figure 2:
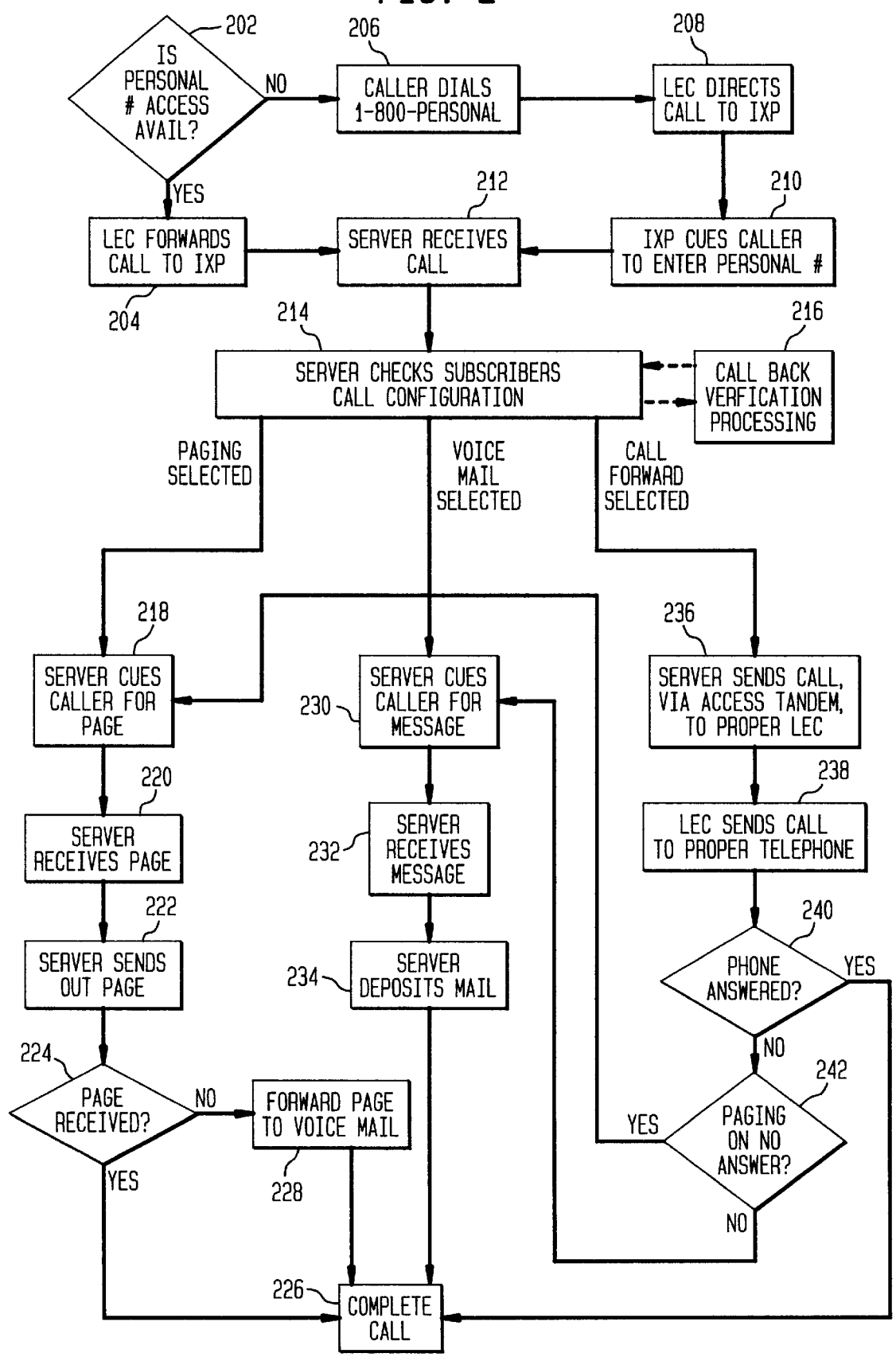
FIG. 2 is a flow diagram showing the preferred method of the present invention in relation to the communication system shown in FIG. 1 for inbound calls.
Figure 5:
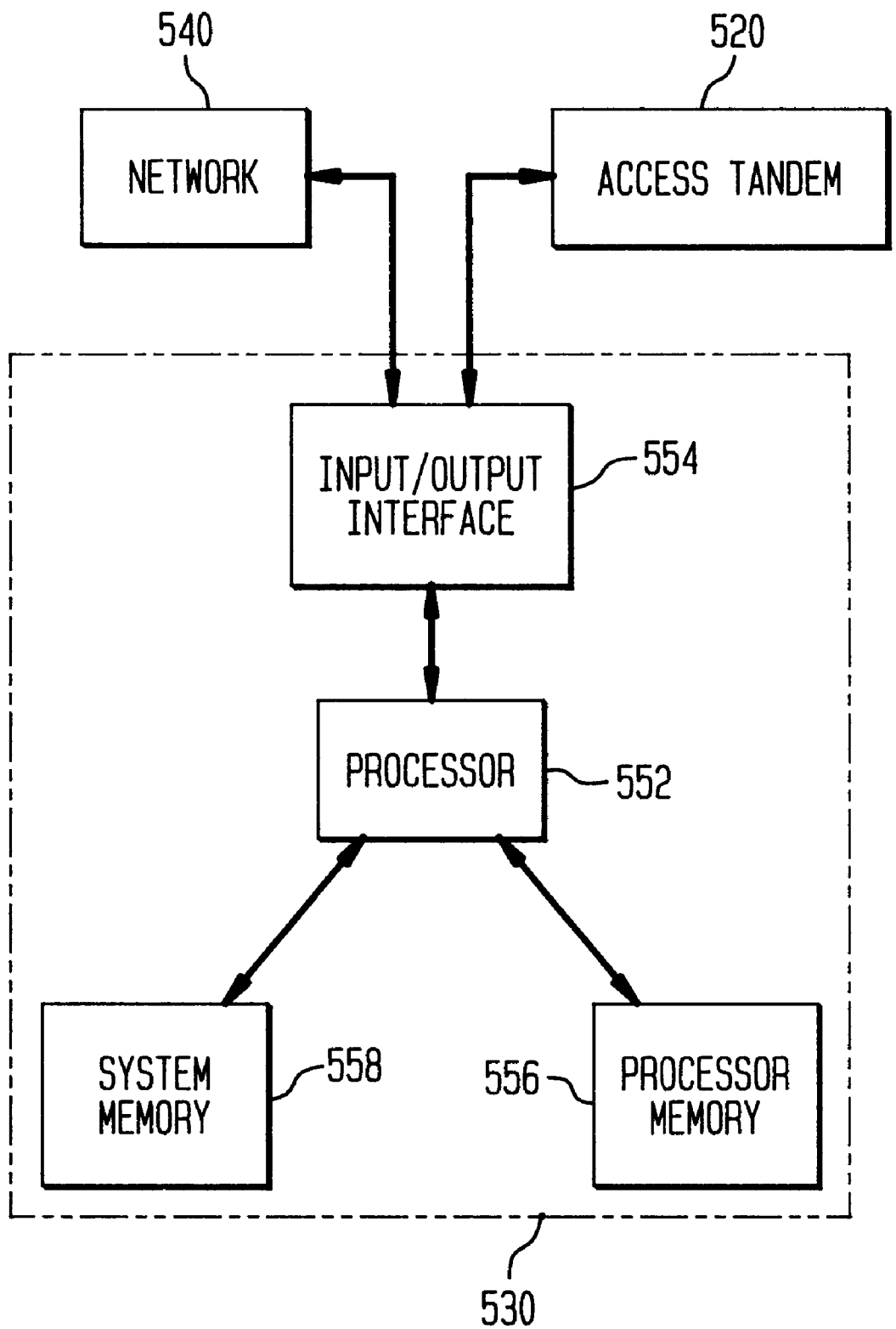
FIG. 5 is a schematic diagram of a representative inter-exchange provider server of the communication system shown in FIG. 1.

FIG. 2 shows a flow diagram that illustrates the specific steps of the preferred method of the present invention for inbound calls. A preferred hardware configuration for the local servers that effectuate the steps shown in FIG. 2 is shown in FIG. 5. The first step 202 occurs when the caller dials the personal number. If the local LEC provides access to "Personal Number Service," then step 202 continues to step 204, where the LEC forwards the call to the appropriate inter-exchange provider. Otherwise, the LEC rejects the call and the caller must dial a 1-800 number to access the Personal Number Service, in a step 206. The LEC, in a step 208, directs the call to the appropriate inter-exchange provider where, in a step 210, the user is directed to provide the personal number. In either case, a server in the inter-exchange provider, in a step 212, receives the personal phone number.

The server, in a step 214, checks the user configuration for the subscriber being called. As part of the configuration check, an optional check of callback verification may occur in a step 216. Callback verification enables the caller to enter a PIN that causes the incoming call to be billed to the subscriber rather than the caller. Processing by the server then follows one of three main branches, depending on the configuration selected by the subscriber.

If the subscriber has selected paging as the primary mode for receiving incoming calls, the server, in a step 218, directs the caller to enter a paging message. The server receives the paging message in a step 220 and then sends out the page in a step 222. The server determines if the attempted page was successfully completed in a step 224, and if so, completes the call at step 226. If the page was not successfully completed, the server forwards the page to voice mail (assuming the subscriber receives voice mail) in a step 228.

If the subscriber has selected voice mail as the primary mode for receiving incoming calls, the server directs the caller to enter a voice mail message in a step 230. The server, in a step 232, receives the voice mail message and then, in a step 234, deposits the message in the subscriber's voice mailbox and triggers a notification procedure to inform the subscriber that mail is waiting. The server then completes the call in step 226.

If the subscriber has selected call forwarding as the primary mode for receiving incoming calls, the server sends the call, in a step 236, via an access tandem, to the appropriate LEC with instructions to complete the call and notify the server regarding the call's completion. The LEC, in a step 238, attempts to place the call to the appropriate telephone. The server then determines, in a step 240, whether the phone was answered. If the phone was answered, the call is completed in step 226. If the phone was not answered, an additional check is made to determine the subscriber's secondary configuration. In a step 242, the server determines whether paging is selected as the secondary option. If paging is the secondary option, the server continues processing in the step 218, as described above. If paging is not the secondary option, the server continues processing in the step 230 assuming that voice mail is the secondary option.

Figure 3:
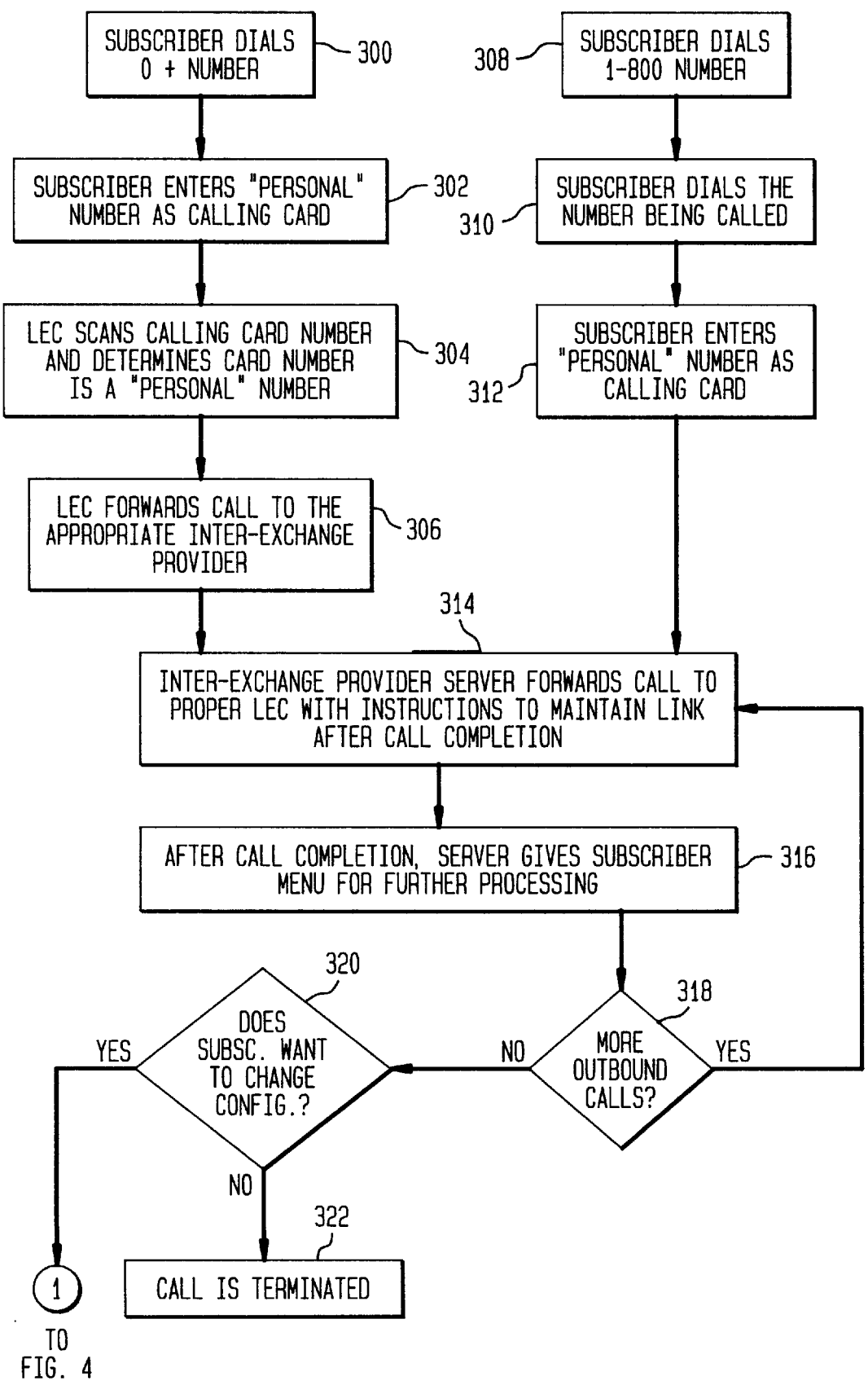
FIG. 3 is a flow diagram showing the preferred method of the present invention in relation to the communication system shown in FIG. 1 for outbound calls.

FIG. 3 shows a flow diagram that illustrates the specific steps of the preferred method of the present invention for outbound calls. A preferred hardware configuration for the local servers that effectuate the steps shown in FIG. 3 is shown in FIG. 5. The subscriber may initiate the process by carrying out one of two steps. In a step 300, the subscriber dials zero plus the number to be called. After being cued by the LEC, the user, in a step 302, enters the "Personal" number as the calling card number requested by the LEC. The LEC, in a step 304, then processes the entered calling card number and determines that the calling card number is, in fact, a "Personal" number. In response to the determination that the number is a "Personal" number by the LEC, the LEC forwards the call to the appropriate inter-exchange provider in a step 306, regardless of which inter-exchange provider the LEC is associated with. Alternatively, in a step 308, the subscriber dials a 1-800 number to gain access to IXP network 130 (the access to IXP network 130 is provided through the LEC that services the geographic region where the 1-800 call is placed). In response to system cues from IXP network 130, the subscriber, as part of a step 310, enters the phone number to be called. Also in response to system cues, the subscriber enters the "Personal" number as the calling card number (in a step 312).

Regardless of the steps of initiating the call, the next step occurs when the inter-exchange provider takes the incoming call and directs the call to a server that, in a step 314, forwards the call to the LEC necessary to complete the call. The server, in carrying out step 314, preferably directs the LEC to maintain the link to the server after the call is terminated to notify the server that the call is complete. Once the call is complete, the server, in a step 316, acts to provide the subscriber with a menu to determine whether additional processing shall take place. The first option provided to the subscriber is whether additional calls are to be placed. If the server determines, in a step 318, that additional calls are to be placed, the subscriber enters the new number and processing is returned to the step 314. If no more outbound calls are desired, the subscriber may be given the opportunity to change his/her configuration. If the server determines that no configuration changes are desired in a step 320, the call is terminated in a step 322. If configuration changes are to be made, processing continues, as described below with respect to FIG. 4.

Figure 4:
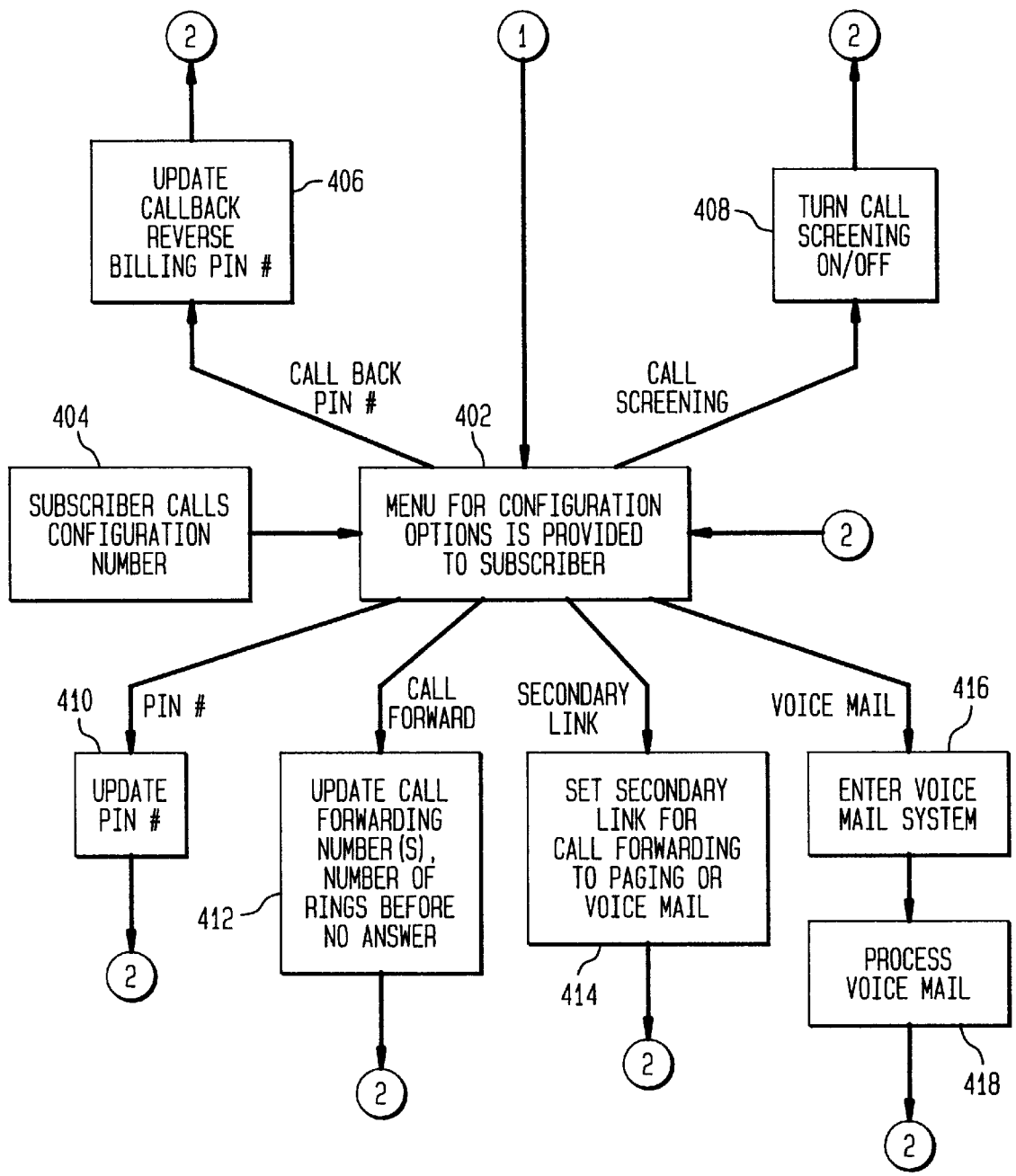
FIG. 4 is a flow diagram showing the preferred method of the present invention in relation to the communication systems shown in FIG. 1 for call management features accessible by the subscriber.

FIG. 4 shows a flow diagram that illustrates the specific steps of the preferred method of the present invention for changing the subscriber accessible call management configuration. A preferred hardware configuration for the local servers that effectuate the steps shown in FIG. 4 is shown in FIG. 5. A configuration menu is provided to the subscriber in a step 402. The configuration menu step may be accessed in one of two ways, either by calling a configuration telephone number (as shown in step 404), or after the completion of an outbound call (as shown by exiting reference numeral 1 in FIG. 3 and entering reference numeral 1 in FIG. 4). While several options are shown for subscriber configuration options, persons skilled in the art will appreciate that not all subscribers will subscribe to all options, and that there may be other options that, in accordance with the principles of the present invention, further enhance the capability to provide subscribers with bidirectional, non-geographic phone service.

After the completion of each configuration option, processing returns to the step 402 where the configuration menu is once again provided to the subscriber. In a step 406, the subscriber is provided with the capability to change one or more callback reverse billing pin numbers. The callback reverse pin numbers, as described above with respect to processing step 216, enable a subscriber to be billed for incoming calls as well as the standard billing of outgoing calls. Processing step 406 enables the subscriber to set one or more callback pin numbers so that multiple individuals may be given their own pin numbers to access the personal system. The call screening capability is toggled between on and off states in a step 408.

The subscriber may change his/her pin number in a step 410, while step 412 provides the subscriber with the opportunity to adjust the call forwarding feature. Call forwarding may be provided to a single telephone number, or it may be set to a series of telephone numbers that are dialed by the server, in sequence, if each attempted call is not answered. The breadth of this option may vary depending on the level at which the subscriber chooses to subscribe to. Additionally, the subscriber may set the number of rings at which the server will assume there is no answer and continue processing.

Once a call forwarded call is not answered, a secondary communication path is sought out. The secondary path is set by the subscriber, in a step 414, to either the paging system or voice mail (as described above and shown in FIG. 2 as step 242). Further, if the subscriber wishes to enter the voice mail system, either to check messages or to set or change an outgoing message, the server processes step 416. Once in voice mail, the server processes messages in a step 418 before returning to the main menu in a step 402.

A simplified schematic diagram of representative circuitry of a local server 530 (e.g., local server 132) that is part of communication system 100 (of FIG. 1) is shown in FIG. 5. Local server 530 includes four basic components: processor 552, input/output interface 554, processor memory 556, and system memory 558. Processor 552 may be as simple as a preprogrammed controller, or it may be as complex as a multi-processor array that performs multi-task processing. Processor memory 556 preferably includes cache memory and may also include processor registers (which may, instead, be included within processor 552). Additionally, processor 552 and processor memory 556 may be combined within a single integrated circuit or combined onto a single circuit board without departing from the spirit of the present invention.

Input/output interface 554 performs various functions to interface processor 552 with the "outside world." The outside world includes network 540 and access tandem 520 (which is representative of any of access tandems 122, 124, 126 and 128 shown in FIG. 1) for processing information communications (including telephone and data communications), as described above. System memory 558 may include random access memory (RAM), hard drives, magneto-optical drives, tape drives, or any other conventional apparatus used to store information in a computer system.

As set forth in the flow charts of FIGS. 2–4, local server 530 provides various capabilities for the subscriber. For example, in processing step 214 of FIG. 2, server 530 performs as follows. Processor 552 retrieves the subscribers configuration information from system memory 558 and loads it into processor memory 556 for processing. The information may include callback verification codes (for step 216). Processor 552 analyzes the retrieved information to determine whether call forwarding, paging or voice mail is the primary inbound call mode. In step 310 of FIG. 3, processor 552 forwards the call through input/output interface 554 to either access tandem 520 or to network 540, depending on whether the call is to be directed to the locally connected access tandem or another access tandem across the network.

Thus, systems and techniques for providing bi-directional, non-geographic telephone service are presented. Persons skilled in the art will appreciate that the present invention may be practiced by other than the described embodiments, which are presented for purposes of illustration and not of limitation, and the present invention is limited only by the claims which follow.

What is claimed is:

1. A method for providing a subscriber with a plurality of call management features that may be accessed through a personal telephone number, said method comprising the steps of:

identifying said personal telephone number with said subscriber, said personal telephone number being independent of said subscriber's physical location, and said personal telephone number being one of a plurality of personal telephone numbers, each of said plurality of personal telephone numbers being allocated to a specific individual subscriber, and wherein said step of identifying includes the steps of
   (i) verifying a callback reverse billing personal identification number (PIN); and
   (ii) billing said subscriber for an inbound phone call if said callback PIN is verified;

coupling said personal telephone number to a device so that said subscriber may receive said inbound phone call through said personal telephone number; and enabling said subscriber to initiate an outbound telephone call using said personal telephone number, said outbound telephone call being independent from any physical calling location, and independent from any inbound call.

2. The method of claim 1, wherein said step of coupling comprises the step of:

coupling said personal telephone number to a paging device so that said subscriber may receive inbound calls as pages through said personal telephone number.

3. The method of claim 2, wherein said step of coupling to a device further comprises the step of:

coupling said personal telephone number to a geographic-based telephone number assigned to said subscriber, said geographic-based number being one of a plurality of geographic-based telephone numbers, said step of coupling said personal telephone number to a geographic-based telephone number occurring prior to said step of coupling to a paging device such that calls to said personal telephone number are coupled to said paging device only after being unanswered at said geographic-based telephone number for a predetermined number of rings.

4. The method of claim 1, wherein said step of coupling comprises the step of:

coupling said personal telephone number to a voice mail system so that said subscriber may receive inbound calls as voice mail messages through said personal telephone number.

5. The method of claim 4, wherein said step of coupling to a device further comprises the step of:

coupling said personal telephone number to a geographic-based telephone number assigned to said subscriber, said geographic-based number being one of a plurality of geographic-based numbers, said step of coupling said personal telephone number to a geographic-based telephone number occurring prior to said step of coupling to a voice mail system such that calls to said personal telephone number are coupled to said voice mail system only after being unanswered at said geographic-based telephone number for a predetermined number of rings.

6. The method of claim 1, wherein said step of coupling to a device comprises the step of:

coupling said personal telephone number to at least one geographic-based telephone number assigned to said subscriber, said at least one geographic-based number being one of a plurality of geographic-based numbers.

7. The method of claim 6, wherein said step of coupling to at least one geographic-based telephone number comprises the steps of:

coupling said personal telephone number to a first geographic-based telephone number assigned to said subscriber, said first geographic-based number being one of said plurality of geographic-based numbers; and coupling said personal telephone number to a second geographic-based telephone number assigned to said subscriber, said second geographic-based number being one of said plurality of geographic-based numbers that is not said first geographic-based number, said coupling to a second number occurring only after said call to said first geographic-based number remains unanswered for a predetermined number of rings.

8. The method of claim 6, wherein said step of coupling to at least one geographic-based telephone number comprises the step of:

coupling said personal telephone number to a predetermined sequence of geographic-based telephone numbers in order, said sequence of geographic-based numbers being from said plurality of geographic-based numbers, said coupling to a predetermined sequence of phone numbers starting with the first geographic-based telephone number in said order and continuing to each subsequent geographic-based telephone number in order after said call remains unanswered at each geographic-based telephone number, said sequence terminating if said call is answered at any geographic-based telephone number in said sequence.

9. The method of claim 1, wherein said step of enabling said subscriber to make outbound calls comprises the steps of:

identifying said personal telephone number as a calling card number;

identifying said calling card number as being associated with a specific inter-exchange provider; and processing said outbound call through said specific inter-exchange provider based on said personal number being said calling card number.

10. The method of claim 9, further comprising the steps of:

determining that a call placed through said specific inter-exchange provider has been completed; and providing said subscriber with the ability to make additional outbound calls without disconnecting from said inter-exchange provider.

11. The method of claim 10, further comprising the step of:

enabling said subscriber to change subscriber configuration information stored for said subscriber by said inter-exchange provider.

12. The method of claim 1, wherein said step of identifying further comprises the step of:

enabling said subscriber to change subscriber configuration information stored for said subscriber by an inter-exchange provider that provides said call management features.

13. The method of claim 12, wherein said step of enabling subscriber configuration changes comprises the step of:

enabling said subscriber to provide and revise one or more callback reverse billing PIN numbers as one of said call management features.

14. The method of claim 12, wherein said step of enabling subscriber configuration changes comprises the step of:

enabling said subscriber to provide and revise a subscriber PIN as one of said call management features.

15. The method of claim 12, wherein said step of enabling subscriber configuration changes comprises the step of:

enabling said subscriber to turn call screening on and off, said call screening being one of said call management features.

16. The method of claim 12, wherein said step of enabling subscriber configuration changes comprises the step of:

enabling said subscriber to enter a voice mail system, said voice mail system being one of said call management features.

17. The method of claim 16, further comprising the step of:

processing said voice mail in said voice mail system, said step of processing occurring after said step of entering said voice mail system.

18. The method of claim 12, wherein said step of enabling subscriber configuration changes comprises the step of:

enabling said subscriber to provide a sequence of one or more forwarding geographic-based telephone numbers from said plurality of geographic-based telephone numbers, said ability to provide a sequence of call forwarding numbers being one of said call management features.

19. The method of claim 18, further comprising the step of:

enabling said subscriber to set a predetermined number of rings at which a called will be deemed unanswered, said capability being one of said call management features.

20. The method of claim 18, wherein said step of enabling subscriber configuration changes comprises the step of:

enabling said subscriber to set a secondary communications path in the event that each call to said sequence of forwarding numbers goes unanswered.

21. The method of claim 20, wherein said step of enabling a secondary path comprises the step of:

enabling said subscriber to set said secondary path to direct said unanswered call to a paging device of said subscriber.

22. The method of claim 20, wherein said step of enabling a secondary path comprises the step of:

enabling said subscriber to set said secondary path to direct said unanswered call to a voice mailbox of said subscriber.

23. A system for providing a plurality of subscribers with bi-directional, non-geographic telephone communication capability between one or more local exchange carrier (LEC), each LEC being connected through an access tandem to an inter-exchange provider network, said system comprising:

a plurality of local servers, there being at least one local server coupled to each LEC;

a network connected to each of said plurality of local servers, said network and said plurality of local servers being connected to form said inter-exchange provider network, said network being capable of transmitting communications between any two of said plurality of local servers, said inter-exchange provider network storing a unique, bi-directional, non-geographic, personal telephone number and subscriber configuration information for each of said plurality of subscribers, said personal telephone numbers enabling said plurality of subscribers to make outbound telephone calls and to receive inbound telephone calls by (i) verifying a callback reverse billing personal identification number (PIN);

(ii) billing said plurality of subscribers if said callback PIN is verified.

* * * * *